United States Patent
Mazumdar et al.

(10) Patent No.: US 8,562,719 B2
(45) Date of Patent: Oct. 22, 2013

(54) SYSTEM FOR ACID GAS REMOVAL

(75) Inventors: Anindra Mazumdar, Katy, TX (US); Judith Pauline Oppenheim, Friendswood, TX (US)

(73) Assignee: General Electric Company, Schenectady, NY (US)

( * ) Notice: Subject to any disclaimer, the term of this patent is extended or adjusted under 35 U.S.C. 154(b) by 550 days.

(21) Appl. No.: 12/831,174

(22) Filed: Jul. 6, 2010

(65) Prior Publication Data

US 2012/0006200 A1    Jan. 12, 2012

(51) Int. Cl.
*B01D 53/14* (2006.01)

(52) U.S. Cl.
USPC ........ 95/234; 96/244; 95/13; 95/161; 95/165; 95/173; 95/199; 95/223; 95/235; 95/236

(58) Field of Classification Search
USPC ............. 96/156, 181, 199, 234, 243; 95/169, 95/181, 183, 199, 229, 235–237
See application file for complete search history.

(56) References Cited

U.S. PATENT DOCUMENTS

| | | | |
|---|---|---|---|
| 2,424,108 A * | 7/1947 | Merten | 91/49 |
| 4,957,515 A | 9/1990 | Hegarty | |
| 7,147,691 B2 | 12/2006 | Palmer | |
| 7,597,746 B2 * | 10/2009 | Mak et al. | 95/169 |
| 7,637,987 B2 * | 12/2009 | Mak | 95/160 |
| 8,211,213 B2 * | 7/2012 | Lechnick et al. | 95/159 |

* cited by examiner

*Primary Examiner* — Duane Smith
*Assistant Examiner* — Phillip Shao
(74) *Attorney, Agent, or Firm* — Fletcher Yoder P.C.

(57) ABSTRACT

A gas purification system including a hydrogen sulfide ($H_2S$) absorber, a carbon dioxide ($CO_2$) absorber, a flash tank, and a $H_2S$ concentrator. The gas purification system may also include a gas path though the $H_2S$ absorber prior to the $CO_2$ absorber, a first solvent path sequentially through the $CO_2$ absorber, the $H_2S$ absorber, and the $H_2S$ concentrator, and a second solvent path sequentially through the $CO_2$ absorber, the flash tank, and the $H_2S$ concentrator, wherein the first and second solvent paths flow a common solvent.

16 Claims, 4 Drawing Sheets

SYSTEM FOR ACID GAS REMOVAL

BACKGROUND OF THE INVENTION

The subject matter disclosed herein relates to carbon dioxide capture and acid gas removal in a power plant.

In general, integrated gasification combined cycle (IGCC) power plants are capable of generating energy from various hydrocarbon feedstock, such as coal, relatively cleanly and efficiently. IGCC technology may convert the hydrocarbon feedstock into a gas mixture of carbon monoxide (CO) and hydrogen ($H_2$), i.e., syngas, by reaction with oxygen and steam in a gasifier. These gases may be sweetened, processed, and utilized as fuel in a conventional combined cycle power plant. For example, the syngas may be fed into a combustor of a gas turbine of the IGCC power plant and ignited to power the gas turbine for use in the generation of electricity.

The sweetening and the processing of the syngas may include removal of impurities other than $H_2S$ from the syngas. Unfortunately, there are often tradeoffs in the removal of different impurities. For example, the removal of sulfur may affect the removal of carbonous gasses. Accordingly, processes and systems capable of adequate removal of the various impurities from generated syngas are desirable.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a gas purification system includes a hydrogen sulfide ($H_2S$) absorber, a carbon dioxide ($CO_2$) absorber, a flash tank, a $H_2S$ concentrator, a gas path though the $H_2S$ absorber upstream of the $CO_2$ absorber, a first solvent path sequentially through the $CO_2$ absorber, the $H_2S$ absorber, and the $H_2S$ concentrator, and a second solvent path sequentially through the $CO_2$ absorber, the flash tank, and the $H_2S$ concentrator, wherein the first and second solvent paths flow a common solvent.

In a second embodiment, a gas purification system includes a hydrogen sulfide ($H_2S$) absorber configured to remove $H_2S$ from a raw gas to produce a sweet gas and an $H_2S$ rich fluid, wherein the raw gas comprises less than approximately 1 percent by volume $H_2S$, a solvent recovery unit configured to generate an acid gas stream from the $H_2S$ rich fluid, wherein the acid gas stream comprises greater than approximately 25 percent by volume $H_2S$, and a carbon dioxide ($CO_2$) recovery unit configured to remove $CO_2$ from the sweet gas to produce a $CO_2$ capture gas having a $CO_2$ concentration greater than approximately 90 percent.

In a third embodiment, a gas purification system includes a hydrogen sulfide ($H_2S$) concentrator column configured to be pressurized to a first pressure level, including a first solvent inlet configured to receive a first solvent that is rich in carbon dioxide ($CO_2$) and lean in $H_2S$, a second solvent inlet configured to receive a second solvent that is rich in H2S and rich in $CO_2$, packing material configured to facilitate mass transfer between vapor and liquid phases of the first and second solvents, a solvent outlet configured to transfer a mixture of the first and second solvents out of the $H_2S$ concentrator column, a first gas inlet configured to receive a stripping gas rich in $CO_2$, and a first gas outlet configured to exhaust the stripping gas rich in $CO_2$.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
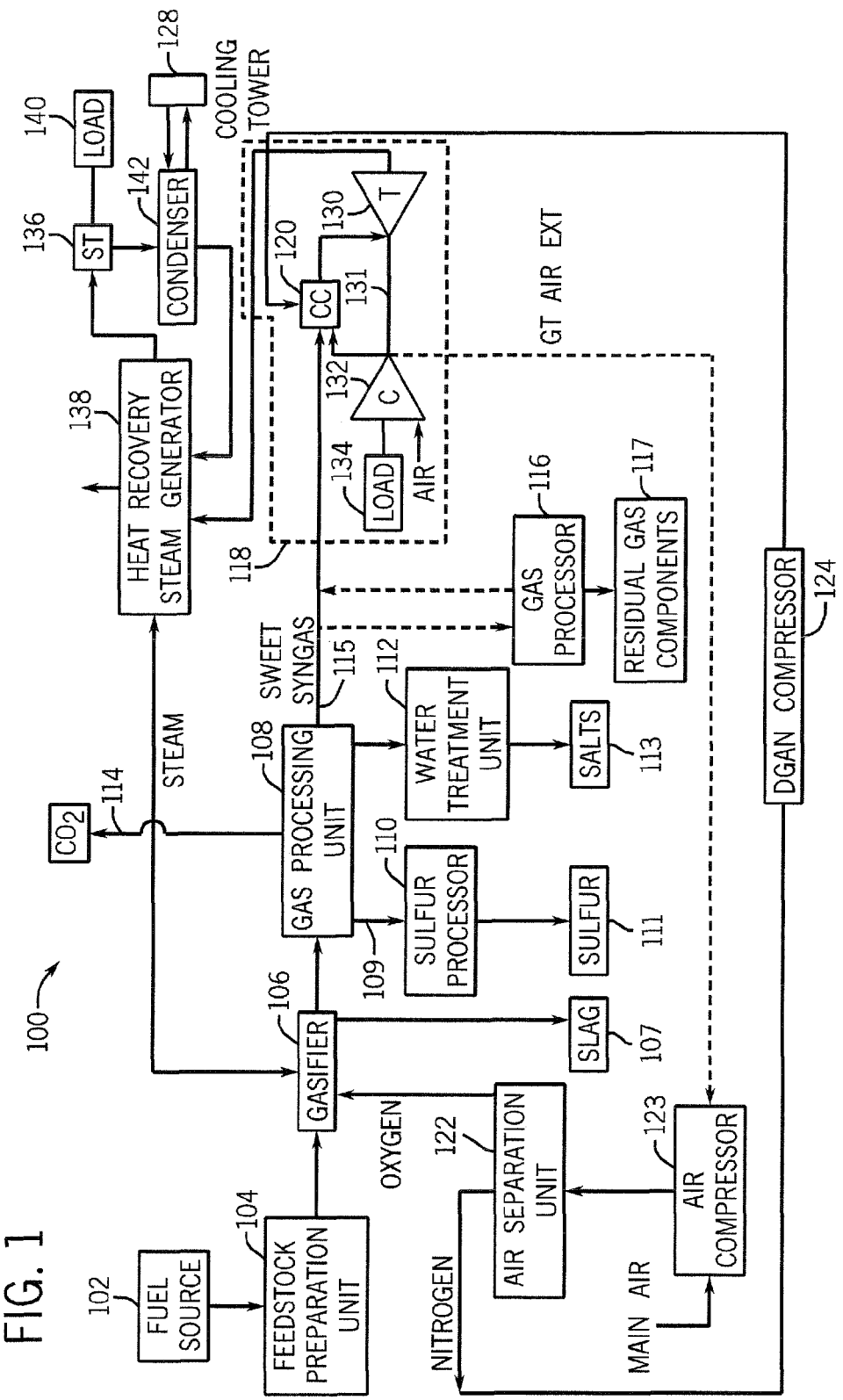
FIG. 1 is a schematic block diagram of an embodiment of an integrated gasification combined cycle (IGCC) power plant.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed to generation of an acid gas stream simultaneous with the capture of carbonous gas (e.g., carbon dioxide) from syngas. Raw syngas, that is, syngas with hydrogen sulfide ($H_2S$) present, may be processed to generate sweet syngas, that is, syngas with minimal levels of $H_2S$ present, such as, 25 parts per million. This process may occur, for example, in an acid gas removal (AGR) section of an integrated gasification combined cycle system. The AGR may generate acid gas that may be transmitted to a sulfur processor for removal of any sulfur present in the acid gas. Additionally, there may be present amounts of carbon dioxide ($CO_2$) in the raw syngas. It may be advantageous to capture this $CO_2$ for storage and/or use in other applications.

In some embodiments, low sulfur coals (e.g., coals with low concentrations of sulfur) may be utilized to generate the syngas. Use of these coals may complicate the sulfur recovery process described above. To insure that both the acid gas has a sufficient amount of $H_2S$ present in the acid gas for efficient sulfur processing to occur and that a $CO_2$ stream contains sufficient $CO_2$ levels by volume to meet storage or other downstream requirements, a common solvent may be transmitted from a flash tank in a $CO_2$ recovery unit of the AGR to a solvent recovery unit of the AGR. The common solvent may carry $CO_2$, which may be stripped by the solvent recovery unit and added to the $CO_2$ captured by a $CO_2$ recovery unit of the AGR.

In this manner, the overall $CO_2$ level generated by the AGR may include at least approximately 90% $CO_2$ by volume, while an acid gas stream generated by the AGR may include at least approximately 25% $H_2S$ by volume, which may be an amount of $H_2S$ that allows for efficient sulfur processing (which may be relevant when utilizing low sulfur coals to generate the sulfur). Furthermore, the captured $CO_2$ stream may include at most approximately 2000 parts per million (ppm) $H_2S$. Finally, the sweet syngas generated by the AGR may include less than or equal to approximately 25 ppm $H_2S$. Therefore, the AGR may simultaneously meet specifications that allow for proper sulfur recovery from acid gas, even when this acid gas is the product of low sulfur coals, while meeting, for example, certain environmental regulations for the use of $CO_2$ in applications such as enhanced oil recovery as well as certain environmental regulations relating to the use of syngas as a fuel source in an IGCC system.

FIG. 1 is a diagram of an embodiment of an integrated gasification combined cycle (IGCC) system 100 that may be powered by synthetic gas, i.e., syngas. Elements of the IGCC system 100 may include a fuel source 102, such as a solid feed, that may be utilized as a source of energy for the IGCC. The fuel source 102 may include coal (including low sulfur content coal), petroleum coke, biomass, wood-based materials, agricultural wastes, tars, coke oven gas and asphalt, or other carbon containing items.

The solid fuel of the fuel source 102 may be passed to a feedstock preparation unit 104. The feedstock preparation unit 104 may, for example, resize or reshaped the fuel source 102 by chopping, milling, shredding, pulverizing, briquetting, or palletizing the fuel source 102 to generate feedstock. Additionally, water, or other suitable liquids may be added to the fuel source 102 in the feedstock preparation unit 104 to create slurry feedstock. In other embodiments, no liquid is added to the fuel source, thus yielding dry feedstock.

The feedstock may be passed to a gasifier 106 from the feedstock preparation unit 104. The gasifier 106 may convert the feedstock into a syngas, e.g., a combination of carbon monoxide and hydrogen. This conversion may be accomplished by subjecting the feedstock to a controlled amount of steam and oxygen at elevated pressures, e.g., from approximately 20 bar to 85 bar, and temperatures, e.g., approximately 700 degrees Celsius-1600 degrees Celsius, depending on the type of gasifier 106 utilized. The gasification process may include the feedstock undergoing a pyrolysis process, whereby the feedstock is heated. Temperatures inside the gasified 106 may range from approximately 150 degrees Celsius to 700 degrees Celsius during the pyrolysis process, depending on the fuel source 102 utilized to generate the feedstock. The heating of the feedstock during the pyrolysis process may generate a solid, (e.g., char), and residue gases, (e.g., carbon monoxide, hydrogen, and nitrogen). The char remaining from the feedstock from the pyrolysis process may only weigh up to approximately 30% of the weight of the original feedstock.

A combustion process may then occur in the gasifier 106. The combustion may include introducing oxygen to the char and residue gases. The char and residue gases may react with the oxygen to form carbon dioxide and carbon monoxide, which provides heat for the subsequent gasification reactions. The temperatures during the combustion process may range from approximately 700 degrees Celsius to 1600 degrees Celsius. Next, steam may be introduced into the gasifier 106 during a gasification step. The char may react with the carbon dioxide and steam to produce carbon monoxide and hydrogen at temperatures ranging from approximately 800 degrees Celsius to 1100 degrees Celsius. In essence, the gasifier utilizes steam and oxygen to allow some of the feedstock to be "burned" to produce carbon monoxide and energy, which drives a second reaction that converts further feedstock to hydrogen and additional carbon dioxide.

In this way, a resultant gas is manufactured by the gasifier 106. This resultant gas may include approximately 85% of carbon monoxide and hydrogen, as well as $CH_4$, HCl, HF, COS, $NH_3$, HCN, and $H_2S$ (based on the sulfur content of the feedstock). This resultant gas may be termed raw syngas and may include less than approximately 20 percent by volume $H_2S$. The gasifier 106 may also generate waste, such as slag 107, which may be a wet ash material. This slag 107 may be removed from the gasifier 106 and disposed of, for example, as road base or as another building material. To sweeten the raw syngas, a gas processing unit 108 may be utilized. The gas processing unit 108 may scrub the raw syngas to remove the HCl, HF, COS, HCN, and $H_2S$ from the raw syngas, which may include separation of and transmission of $H_2S$ rich acid gas to a sulfur processor 110 via path 109. The acid gas may be processed by the sulfur processor 110 to generate sulfur 111. Furthermore, the gas processing unit 108 may separate salts 113 from the raw syngas via a water treatment unit 112 that may utilize water purification techniques to generate usable salts 113 from the raw syngas. The gas processing unit 108 may also undertake carbon dioxide ($CO_2$) capture, whereby the $CO_2$ is removed from the raw syngas and is transmitted along path 114 to, for example, a pipeline for external transmission. Subsequent to the processes described above, the gas exiting the gas processing unit 108 along path 115 may include sweet syngas, i.e. substantially free from sulfur, as well as residual gas components such as $NH_3$ (ammonia).

A gas processor 116 may be utilized to remove residual gas components 117 from the sweet syngas such as, ammonia and methane, as well as methanol or any residual chemicals. However, removal of residual gas components 117 from the sweet syngas is optional, since the sweet syngas may be utilized as a fuel even when containing the residual gas components 117, e.g., tail gas. At this point, the sweet syngas may include approximately 3% CO, approximately 55% $H_2$, and approximately 40% $CO_2$ and is substantially stripped of $H_2S$. It should be noted that based on the level of $CO_2$ capture accomplished in the gas processing unit 108, the percentage of CO and $H_2$ in the sweet syngas may increase. This sweet syngas may be transmitted to a combustor 120, e.g., a combustion chamber, of a gas turbine engine 118 as combustible fuel.

The IGCC system 100 may further include an air separation unit (ASU) 122. The ASU 122 may operate to separate air into component gases by, for example, distillation techniques. The ASU 122 may separate oxygen from the air supplied to it from a supplemental air compressor 123, and the ASU 122 may transfer the separated oxygen to the gasifier 106. Additionally the ASU 122 may transmit separated nitrogen to a diluent nitrogen (DGAN) compressor 124.

The DGAN compressor 124 may compress the nitrogen received from the ASU 122 at least to pressure levels equal to those in the combustor 120, so as not to interfere with the proper combustion of the syngas. Thus, once the DGAN compressor 124 has adequately compressed the nitrogen to a proper level, the DGAN compressor 124 may transmit the compressed nitrogen to the combustor 120 of the gas turbine engine 118.

As described previously, the compressed nitrogen may be transmitted from the DGAN compressor 124 to the combustor 120 of the gas turbine engine 118. The gas turbine engine 118 may include a turbine 130, a drive shaft 131 and a compressor 132, as well as the combustor 120. The combustor 120 may receive fuel, such as syngas, which may be injected under pressure from fuel nozzles. This fuel may be mixed with compressed air as well as compressed nitrogen from the DGAN compressor 124, and combusted within combustor 120. This combustion may create hot pressurized exhaust gases.

The combustor 120 may direct the exhaust gases towards an exhaust outlet of the turbine 130. As the exhaust gases from the combustor 120 pass through the turbine 130, the exhaust gases may force turbine blades in the turbine 130 to rotate the drive shaft 131 along an axis of the gas turbine engine 118. As illustrated, the drive shaft 131 is connected to various components of the gas turbine engine 118, including the compressor 132.

The drive shaft 131 may connect the turbine 130 to the compressor 132 to form a rotor. The compressor 132 may include blades coupled to the drive shaft 131. Thus, rotation of turbine blades in the turbine 130 may cause the drive shaft 131 connecting the turbine 130 to the compressor 132 to rotate blades within the compressor 132. This rotation of blades in the compressor 132 causes the compressor 132 to compress air received via an air intake in the compressor 132. The compressed air may then be fed to the combustor 120 and mixed with fuel and compressed nitrogen to allow for higher efficiency combustion. Drive shaft 131 may also be connected to load 134, which may be a stationary load, such as an electrical generator for producing electrical power, for example, in a power plant. Indeed, load 134 may be any suitable device that is powered by the rotational output of the gas turbine engine 118.

The IGCC system 100 also may include a steam turbine engine 136 and a heat recovery steam generation (HRSG) system 138. The steam turbine engine 136 may drive a second load 140. The second load 140 may also be an electrical generator for generating electrical power. However, both the first and second loads 134, 140 may be other types of loads capable of being driven by the gas turbine engine 118 and steam turbine engine 136. In addition, although the gas turbine engine 118 and steam turbine engine 136 may drive separate loads 134 and 140, as shown in the illustrated embodiment, the gas turbine engine 118 and steam turbine engine 136 may also be utilized in tandem to drive a single load via a single shaft. The specific configuration of the steam turbine engine 136, as well as the gas turbine engine 118, may be implementation-specific and may include any combination of sections.

The system 100 may also include the HRSG 138. Heated exhaust gas from the gas turbine engine 118 may be transported into the HRSG 138 and used to heat water and produce steam used to power the steam turbine engine 136. Exhaust from, for example, a low-pressure section of the steam turbine engine 136 may be directed into a condenser 142. The condenser 142 may utilize a cooling tower 128 to exchange heated water for chilled water. The cooling tower 128 acts to provide cool water to the condenser 142 to aid in condensing the steam transmitted to the condenser 142 from the steam turbine engine 136. Condensate from the condenser 142 may, in turn, be directed into the HRSG 138. Again, exhaust from the gas turbine engine 118 may also be directed into the HRSG 138 to heat the water from the condenser 142 and produce steam.

In combined cycle systems such as IGCC system 100, hot exhaust may flow from the gas turbine engine 118 and pass to the HRSG 138, where it may be used to generate high-pressure, high-temperature steam. The steam produced by the HRSG 138 may then be passed through the steam turbine engine 136 for power generation. In addition, the produced steam may also be supplied to any other processes where steam may be used, such as to the gasifier 106. The gas turbine engine 118 generation cycle is often referred to as the "topping cycle," whereas the steam turbine engine 136 generation cycle is often referred to as the "bottoming cycle." By combining these two cycles as illustrated in FIG. 1, the IGCC system 100 may lead to greater efficiencies in both cycles. In particular, exhaust heat from the topping cycle may be captured and used to generate steam for use in the bottoming cycle.

Figure 2:
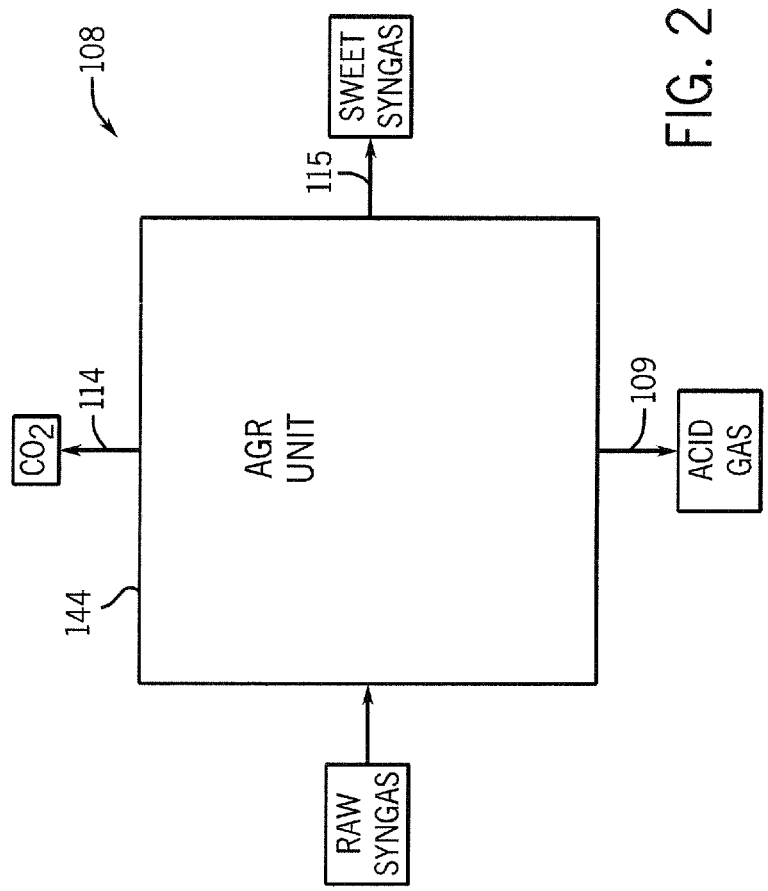
FIG. 2 is a schematic block diagram of an embodiment of an acid gas removal (AGR) unit of the gas cleaning unit of FIG. 1.

FIG. 2 illustrates is a schematic block diagram of a first embodiment of the gas processing unit 108 discussed above. The gas processing unit 108 may include an acid gas removal (AGR) unit 144 that operates to remove, for example, $H_2S$ and $CO_2$ from received raw syngas, which may have been generated from a low sulfur fuel source, such as, low sulfur content coal, leading to lower concentrations of $H_2S$ (approximately less than 0.1, 0.2, 0.5, 1, or 2% $H_2S$ by volume) in the raw syngas. In one embodiment, the AGR unit 144 may receive the raw syngas, and may process the raw syngas to produce ($H_2S$ rich) acid gas, for transmission along path 109. Additionally, the AGR unit 144 may process the raw syngas to produce a $CO_2$ stream, for transmission along path 114. Finally, by removing the $H_2S$ and $CO_2$ from the received raw syngas, the AGR unit 144 may generate sweet syngas for transmission along path 115. In this manner, the AGR unit 144 may operate to "sweeten" the raw syngas (i.e., remove acid gas from the raw syngas, as well as $CO_2$ from the raw syngas).

In one embodiment, the acid gas transmitted along path 109 may include at least approximately 25% $H_2S$ by volume, even if generated from low sulfur content fuel. That is, the acid gas transmitted along path 109 may include at least equal to or greater than approximately 25%, 30%, 35%, 40%, or more $H_2S$ by volume. Additionally, the captured $CO_2$ stream transmitted along path 114 may include at least approximately 90% $CO_2$ by volume. That is, the $CO_2$ stream transmitted along path 114 may include at least equal to or greater than approximately 90%, 95%, or more $CO_2$ by volume. Furthermore, the captured $CO_2$ stream transmitted along path 114 may include at most approximately 2000 parts per million (ppm) $H_2S$. Finally, the sweet syngas transmitted along path 115 may include at most approximately 25 ppm $H_2S$. The specifications above may allow for proper sulfur recovery from the acid gas and may meet, for example, certain environmental regulations for the use of $CO_2$ in applications such as enhanced oil recovery as well as certain environmental regulations relating to the use of syngas as a fuel source in the IGCC system 100.

Figure 3:
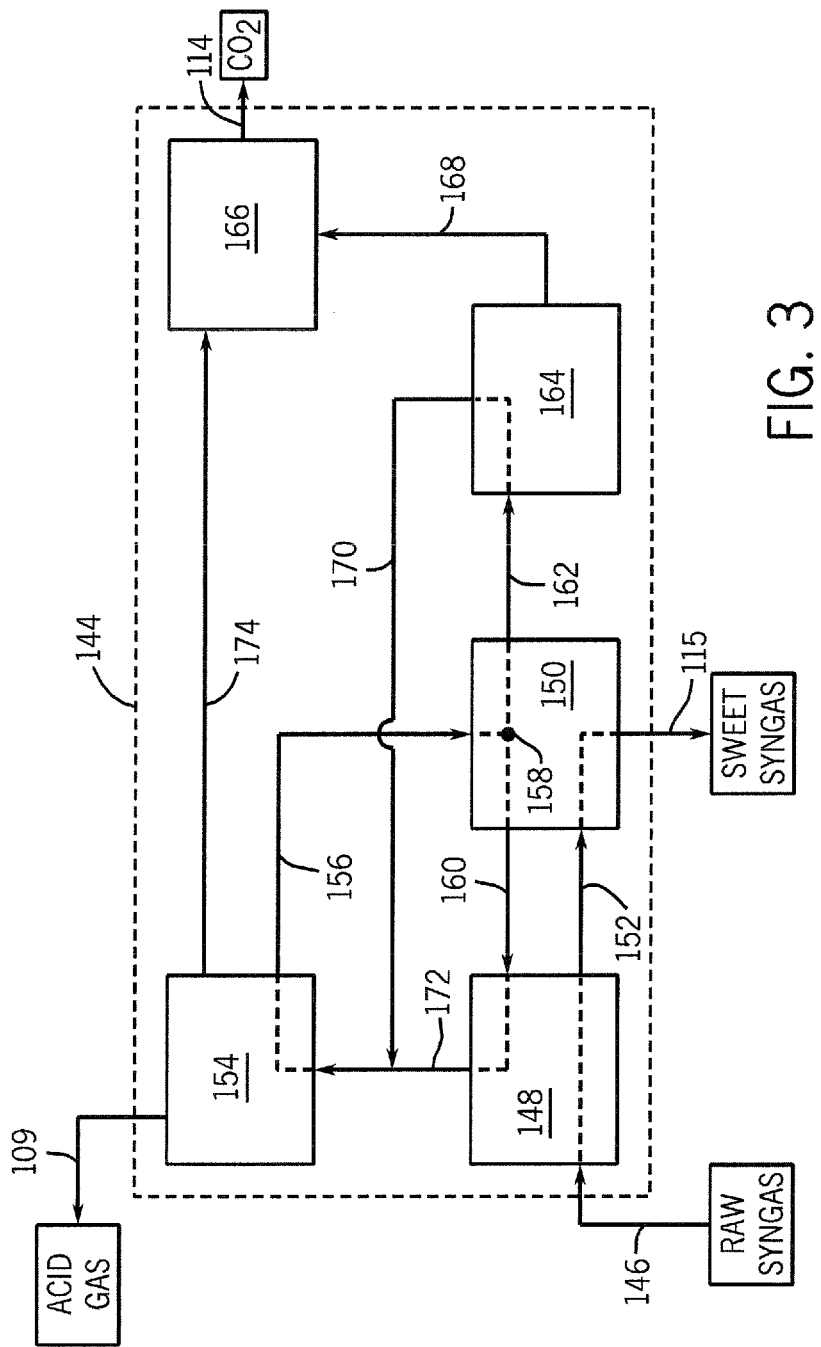
FIG. 3 is a schematic block diagram of a first embodiment of elements of the AGR unit of FIG. 2.

FIG. 3 is a schematic block diagram of an embodiment of the AGR unit 144 that contains various elements, which execute processes undertaken to simultaneously meet the specifications outlined above for production of acid gas, $CO_2$, and sweet syngas in an AGR unit 144. Raw syngas may flow along path 146 and may enter an $H_2S$ absorber 148. The $H_2S$ absorber 148 may operate to remove $H_2S$ from the raw syngas and may pass the $H_2S$ lean $CO_2$ rich syngas stream to a $CO_2$ absorber 150 along path 152. The $CO_2$ absorber 150 may operate to remove $CO_2$ from the $H_2S$ lean $CO_2$ rich stream received from path 152. Upon removal of $CO_2$ from the $H_2S$ lean $CO_2$ rich stream received from path 152, $CO_2$ absorber 150 may transmit sweet syngas both lean in $H_2S$ and $CO_2$ along path 115, such that the sweet syngas may include at most approximately 25 ppm $H_2S$.

The removal of $H_2S$ from the raw syngas in the $H_2S$ absorber 148 and the removal of $CO_2$ from the $H_2S$ lean $CO_2$ rich stream received from path 152 in the $CO_2$ absorber 150 may be accomplished via amine gas treating, whereby a liquid solvent having one or more various alkanolamines (or amines) may be used to remove $H_2S$ and $CO_2$ from gases. Examples of amines used in this manner include, for example, monoethanolamine, diethanolamine, methyldiethanolamine, diisopropylamine, and aminoethoxyethanol. The amine solvent may be a common amine solvent, in that it may be commonly transmitted amongst various elements of the AGR unit 144 including the $H_2S$ absorber 148, the $CO_2$ absorber 150, a solvent recovery unit 154, and a $CO_2$ recovery unit 164, as described below.

In one embodiment, an amine solvent may, for example, be transmitted from a solvent recovery unit 154 along path 156. The solvent (initially $H_2S$ and $CO_2$ lean) may be transmitted to the $CO_2$ absorber 150, where the solvent absorbs $CO_2$. The path of the solvent may be split in the $CO_2$ absorber 150 at junction 158 into two paths solvent paths. That is, a portion of the solvent (now $H_2S$ lean and $CO_2$ rich) may be transmitted to the $H_2S$ absorber 148 along path 160 to absorb $H_2S$ from the raw syngas stream, causing the solvent to be $H_2S$ and $CO_2$ rich along path 172. The remainder of the $H_2S$ lean and $CO_2$ rich solvent may be transmitted from junction 158 along path 162 to a $CO_2$ recovery unit 164. The $CO_2$ recovery unit 164 may remove $CO_2$ from the $H_2S$ lean and $CO_2$ rich solvent via, for example, a stripper and reboiler, and may pass the captured $CO_2$ to a $CO_2$ compression unit 166 along path 168 for transmission of the $CO_2$ on path 114.

Additionally, the $CO_2$ recovery unit 164 may transmit $H_2S$ lean and moderately $CO_2$ rich solvent along path 170 for transmission to the $CO_2$ absorber 150. For example, the $H_2S$ lean and moderately $CO_2$ rich solvent transmitted along path 170 may be mixed with solvent transmitted along path 156 from the solvent recovery unit 154. Additionally and/or alternatively, the $H_2S$ lean and moderately $CO_2$ rich solvent transmitted along path 170 may be transmitted directly to the $CO_2$ absorber 150.

Furthermore, $H_2S$ rich and $CO_2$ rich solvent may be transmitted from the $H_2S$ absorber 148 along path 172 to the solvent recovery unit 154. In the solvent recovery unit 154, the solvent may be stripped of its absorbed $H_2S$, which may be transmitted as acid gas along path 109. It should be noted that the solvent described herein may refer to a common solvent passed through each of the $H_2S$ absorber 148, the $CO_2$ absorber 150, and the solvent recovery unit 154, and the $CO_2$ recovery unit 164. Additionally, the solvent may be stripped of its absorbed $CO_2$, which may be transmitted to the $CO_2$ compression unit 166 along path 174. Furthermore, utilizing this configuration, it may be possible to transmit acid gas along path 109 to, for example, the sulfur processor 110, whereby the acid gas may include at least approximately 25% $H_2S$ by volume, even when generated from low sulfur content fuels. Because the acid gas may include at least approximately 25% $H_2S$ by volume, efficient processing of the sulfur in the acid gas may occur in the sulfur processor 110. Simultaneously, with the generation of this acid gas, $CO_2$ may be generated for transmission, whereby the $CO_2$ includes at least approximately 90% $CO_2$ by volume and at most approximately 2000 parts per million (ppm) $H_2S$. Accordingly, the AGR unit 144 described above is able to process even low sulfur content fuels and generate acid gas that allow for efficient sulfur processing in the sulfur processor 110 while capturing carbon efficiently.

Figure 4:
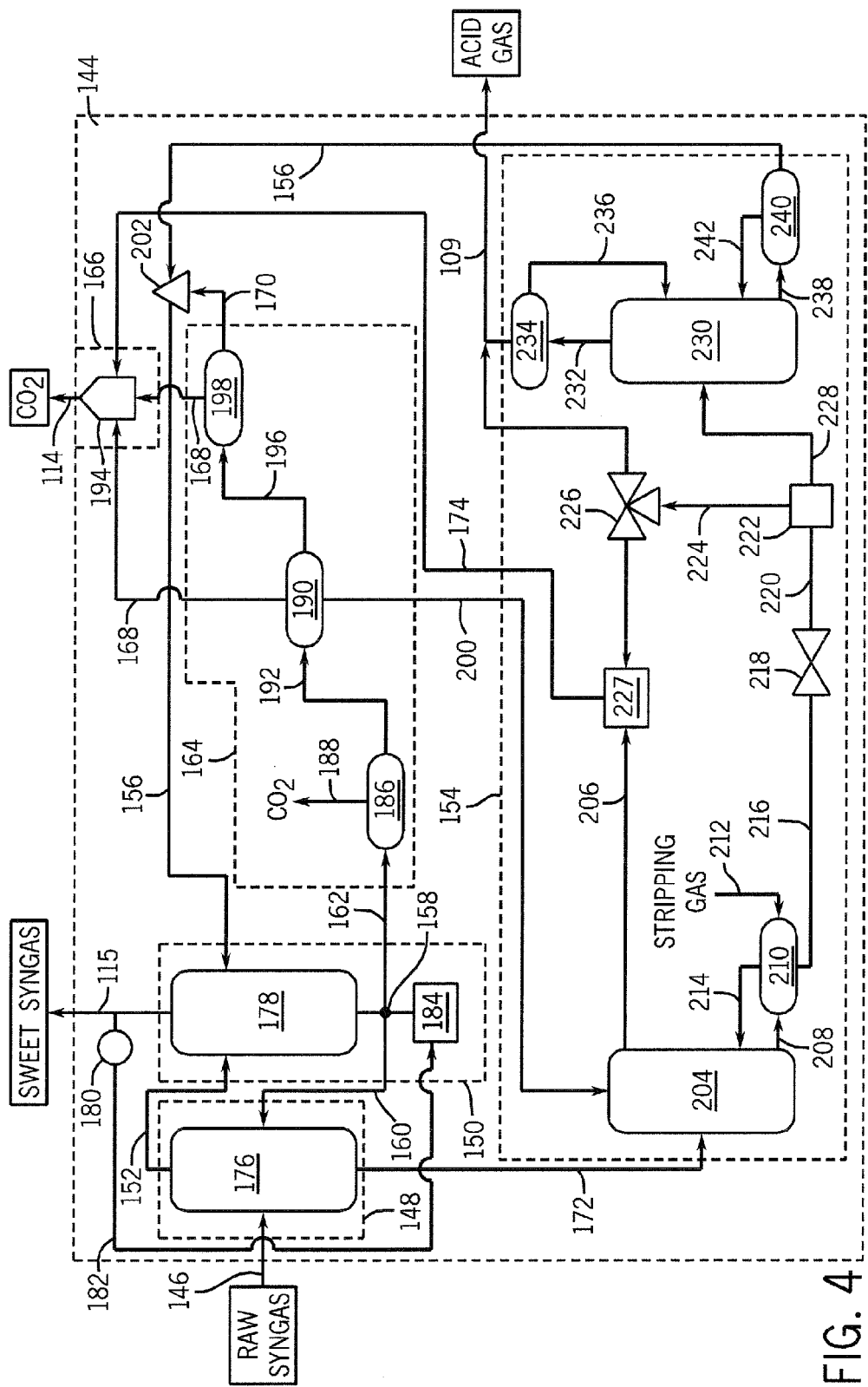
FIG. 4 is a detailed block diagram of the first embodiment of elements of the AGR unit of FIG. 2.

FIG. 4 illustrates a detailed block diagram of the AGR unit 144. Raw syngas may pass along path 146 and may enter the $H_2S$ absorber 148, which may include a $H_2S$ absorption column 176. Solvent introduced from path 160 ($H_2S$ lean and $CO_2$ rich) may interact with $H_2S$ rich and $CO_2$ rich raw syngas in the $H_{25}$ absorption column 176, which may cause $H_2S$ to be absorbed into the solvent (now $H_2S$ rich and $CO_2$ rich) exiting along path 172. The now $H_2S$ lean $CO_2$ rich syngas may exit the $H_2S$ absorption column 176 via path 152 and may enter a $CO_2$ absorption column 178, where the $H_2S$ lean $CO_2$ rich syngas may contact $H_2S$ lean and $CO_2$ lean solvent received in the $CO_2$ absorption column 178 via path 156. The $H_2S$ lean and $CO_2$ lean solvent introduced from path 156 may interact with the $H_2S$ lean and $CO_2$ rich syngas in the $CO_2$ absorption column 178, which may cause $CO_2$ to be absorbed into the $H_2S$ lean and $CO_2$ lean solvent receive from path 156. The now substantially $H_2S$ and $CO_2$ free sweet syngas may pass from the $CO_2$ absorption column 178 via path 115.

As the sweet syngas exits the $CO_2$ absorption column 178 of the $CO_2$ absorber 150, a sensor 180 may detect the amount of $H_2S$ in the sweet syngas. The sensor 180 may transmit signals indicative of the $H_2S$ levels in the sweet syngas along path 182 to a solvent controller 184. The solvent controller 184 may receive the signals and may determine what portion of the $H_2S$ lean and $CO_2$ rich solvent being split at junction 158 should be transmitted along path 160 to the $H_2S$ absorption column 176 and what portion of the $H_2S$ lean and $CO_2$ rich solvent should be transmitted along path 162 to the $CO_2$ recovery unit 164. For example, in one embodiment, the solvent controller 184 may adjust the $H_2S$ lean and $CO_2$ rich solvent passing through junction 158 so that at most approximately 10% by volume of the $H_2S$ lean and $CO_2$ rich solvent is transmitted along path 160, while at least approximately 90% by volume of the $H_2S$ lean and $CO_2$ rich solvent is transmitted along path 162. Through the control of $H_2S$ lean and $CO_2$ rich solvent transferred to the $H_2S$ absorber 148 and the $CO_2$ recovery unit 164, the solvent controller may be insure that the generation of sweet syngas, acid gas, $CO_2$ is in conformity with any specifications set by, for example, a user or a standard.

As noted above, at least approximately 90% by volume of the $H_2S$ lean and $CO_2$ rich solvent may be transmitted along path 162. This $H_2S$ lean and $CO_2$ rich solvent will be saturated with $CO_2$, having passed through the $CO_2$ absorber 150. The $H_2S$ lean and $CO_2$ rich solvent may be transmitted along path 162 into the $CO_2$ recovery unit 164, which may include a single flash tank or a multi-stage set of flash tanks (e.g., a manifold, group, or bank of flash tanks). The flash tanks may be tanks used to separate gases from liquids via pressure reductions in the tanks. That is, if the vapor pressure of the gas dissolved in the solvent is greater than the pressure in a given tank, then the gas will separate (e.g., escape) from the solvent. The amount of gas that separates from the solvent may be based on various factors such as the type of solvent, the operating temperature of the flash tank, and/or the pressure inside of the flash tank.

Accordingly, in one embodiment, the $H_2S$ lean and $CO_2$ rich solvent may be transmitted from path 162 into a high pressure flash tank 186. The high pressure flash tank 186 may be pressurized to a level less than that of the absorption column 178 upstream of the high pressure flash tank 186. For example, the absorption column 178 may be pressurized to a level of approximately 600 psi while the high pressure flash tank 186 may be pressurized to a level of approximately 50, 100, 150, 200, 250, or 300 psi less than the absorption column 178. Thus, the solvent transmitted from path 162 is at a higher pressure than the high pressure tank 186, which causes a flash (e.g., a release of dissolved vapor in a solvent due to a pressure reduction) in the high pressure tank 186. This release of gas from the solvent may cause a portion, for example, at least 5, 10, 15, 20, 25%, or more by volume of the $CO_2$ to be released from the solvent. This $CO_2$ may then be transmitted via path 188 for use by, for example, a recycle compressor to compress $CO_2$ for use by, for example, the gasifier 106, while the remaining $CO_2$ in the high pressure flashed solvent will be subsequently processed for storage, sequestration, etc., as described below.

After the high pressure flash is accomplished, the solvent may be transmitted to a medium pressure separator 190 via path 192. The medium pressure separator 190 may operate in substantially the same manner as the high pressure flash tank 186 except that the medium pressure separator 190 may execute a "flash" of the solvent transmitted along path 192. The medium pressure separator 190 may be pressurized to a level of approximately 50, 100, 150, 200, 250, or 300 psi less than the high pressure tank 186. This flash may cause a portion, for example, at least 25, 30, 35, 40, 45%, or more by volume of the $CO_2$ to be released from the high pressure flashed solvent. The released $CO_2$ may then be transmitted via path 168 for compression by a compressor 194 in the $CO_2$ compression unit 166. Additionally, approximately 75, 70, 85, 90, or 95% or at least approximately 90% of the high and medium pressure flashed solvent may be transmitted from the medium pressure separator 190 via path 200 to the solvent recovery unit 154, as will be described in greater detail below. The remaining approximately 5, 10, 15, 20, or 25% of the high and medium pressure flashed solvent may be transmitted from the medium pressure separator 190 via path 196 to a low pressure flash tank 198.

The low pressure flash tank 198 may operate in substantially the same manner as the high pressure flash tank 186 and the medium pressure separator 190, except that the low pressure flash tank 198 may execute a low pressure "flash" of the solvent transmitted along path 196. The low pressure flash tank 198 may be pressurized to a level of approximately 50, 100, 150, 200, 250, or 300 psi less than the medium pressure separator 190. This flash may cause a portion, for example, at least 10, 15, 20, 25, 30%, or more by volume of the $CO_2$ to be released from the high and medium pressure flashed solvent. This $CO_2$ may then be transmitted via path 168 for compression by a compressor 194 in the $CO_2$ compression unit 166. The solvent at this point will be substantially free of both $H_2S$ and $CO_2$. Accordingly, it may be passed from the low pressure flash tank 198 along path 170 to, for example, a solvent recycle pump 202, where the solvent may be joined with solvent along path 156 for transmission to the $CO_2$ absorber 150.

As described above, $H_2S$ lean solvent with substantial $CO_2$ present (approximately 60, 70, 75, 80, 85, 90% of the $CO_2$ present prior to the high pressure flash) may be transmitted from the medium pressure separator 190 via path 200 to the solvent recovery unit 154. Additionally, $H_2S$ rich and $CO_2$ rich solvent may be transmitted to the solvent recovery unit 154 via path 172. The solvent from paths 172 and 200 may enter a $H_2S$ concentrating column 204 through individual inlets and may interact in the $H_2S$ concentrating column 204. The $H_2S$ concentrating column 204 may include packing material randomly dispersed throughout the column 204, which allows for increased surface area for vapor-liquid contact from paths 172 and 200 to occur. The packing material may thus allow for mixing between liquid and vapor phases to promote mass transfer of the $H_2S$ from the liquid to the vapor phase. Additionally, the pressure in the $H_2S$ concentrating column 204 may be lower than the pressure in the $H_2S$ absorption column 176. For example, the pressure in the $H_2S$ concentrating column 204 may be approximately 100, 200, 300, or 400 psi less than the pressure in the $H_2S$ absorption column 176. This pressure difference may cause a flash of the solvent from path 172, causing the solvent to release $CO_2$. This $CO_2$ may be released in the column 204 for transmission via an outlet along path 206.

Furthermore, a mixed solvent, including solvents from path 172 and 200 may exit the $H_2S$ concentrating column 204 via an outlet to path 208 into a $H_2S$ concentration reboiler 210. The reboiler 210 may apply heat to the solvent received via path 208, as well as receive a stripping gas supplied from path 212 via an inlet. The combination of heating the solvent and applying a stripping gas in the reboiler 210, for example, raw syngas, nitrogen, and/or hydrogen, may cause a portion of the $CO_2$ in the solvent to be released from the solvent in the reboiler 210. This $CO_2$, as well as the stripping gas, may then be transmitted from an outlet of the $H_2S$ concentration reboiler 210 to a gas inlet of the $H_2S$ concentrating column 204 via path 214, where it may pass through the $H_2S$ concentrating column 204 and exit the $H_2S$ concentrating column 204 via a gas outlet to path 206.

The $H_2S$ rich $CO_2$ present (approximately at least 15, 20, 25, or 30% $CO_2$ by volume relative to the solvent in the reboiler 210) exiting the reboiler 210 may be transmitted along path 216 to, for example, a pressure control valve 218. This pressure control valve 218 may operate to reduce the pressure from a medium of no more than approximately 10, 15, 20, 25, or 50 psi. This may cause the solvent transmitted along path 220 to be at a low pressure as it enters a transfer gas flash tank 222. The transfer gas flash tank 222 may flash the solvent, i.e. may execute a low pressure "flash," causing a portion, for example, at least 80, 85, 90, 95% or more by volume of the remaining $CO_2$ present in the $H_2S$ rich $CO_2$ present solvent to be released. This $CO_2$ may then be transmitted to a multi-way valve such as the 3-way valve 226. The $CO_2$ may be diverted via the 3-way valve 226 to junction 227 for combination with $CO_2$ received from path 206 (for transmission to the $CO_2$ compression unit 166) or diverted to merge with path 109 to the sulfur recovery process in the sulfur processor 110. In one embodiment, the amount and flow of $CO_2$ transmitted from the 3-way valve 226 may be controlled in light of changing process factors that may occur in relation to startup/shutdown occurrences, downstream upsets/planned outages (e.g. scheduled maintenance), and/or syngas composition changes (e.g. recycle $CO_2$ interruptions).

The solvent transferred along path 228 from the transfer gas flash tank 222 may, accordingly, be $H_2S$ rich and $CO_2$ lean (approximately about 5% or less $CO_2$ by volume). The solvent may be transferred to a solvent stripping column 230. The solvent stripping column may include packing material randomly dispersed throughout the column 230, which allows for increased surface area for vapor-liquid contact to occur. The packing material may thus allow for mixing between liquid and vapor phases to promote mass transfer of the $H_2S$ from the liquid to the vapor phase. That is, as the solvent interacts with the packing material, $H_2S$ may be converted into vapor form, and may be transmitted via path 232 to a solvent stripper condenser 234, which may be a heat exchanger that cools the gas stream to remove any remaining solvent from the $H_2S$ gas stream received along path 232 by condensing the solvent via, for example, a cooling process. Accordingly, the $H_2S$ gas stream may be transmitted from the solvent stripper condenser 234, along path 109 as acid gas for sulfur recovery. Additionally the solvent stripper condenser 234 may transmit any other components whose boiling point falls between the boiling point of the solvent and the $H_2S$ in the column 230, (e.g., water). In this manner, the condenser 234 may return compounds whose boiling points fall between the solvent and the $H_2S$ back to the solvent stripping column 230.

As the $H_2S$ is stripped from the solvent in the solvent stripping column 230, it may be collected and transmitted via path 238 to a solvent stripper reboiler 240, which may be a heat exchanger that applies heat to the solvent to strip off any remaining $H_2S$ gas from the solvent. Any $H_2S$ gas stripped from the solvent may be transmitted to the solvent stripping column 230 via path 242, where it may exit the solvent stripping column 230 via path 232. Subsequent to processing in the solvent stripper reboiler 240, the solvent, now substantially free of both $H_2S$ and $CO_2$, may be transmitted from the solvent stripper reboiler 240 along path 156 to the solvent recycle pump 202. In this manner, the solvent recovery unit 154 may operate to cleanse the solvent of substantially all of the $H_2S$ stripped from the raw syngas. Additionally, $CO_2$ may be extracted from the solvent for transmission to, for example, a $CO_2$ pipeline connected to path 114. Additionally, by including this $CO_2$ capture in the solvent recovery unit 154, approximately at least 90% or more by volume of the $CO_2$ gas stream transmitted along path 114 may be $CO_2$.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A gas purification system, comprising:
a hydrogen sulfide ($H_2S$) absorber;
a carbon dioxide ($CO_2$) absorber;
a flash tank;
a $H_2S$ concentrator;
a gas path though the $H_2S$ absorber upstream of the $CO_2$ absorber;
a first solvent path sequentially and directly through the $CO_2$ absorber, the $H_2S$ absorber, and the $H_2S$ concentrator; and
a second solvent path sequentially and directly through the $CO_2$ absorber, the flash tank, and the $H_2S$ concentrator, wherein the first and second solvent paths flow a common solvent.

2. The gas purification system of claim 1, comprising a controller configured to adjust an amount of the common solvent flowing through the first solvent path and the second solvent path.

3. The gas purification system of claim 2, wherein the controller is configured to receive measurement signals relating to an amount of $H_2S$ in a sweet syngas stream exiting the $CO_2$ absorber.

4. The gas purification system of claim 3, wherein the controller is configured to adjust a ratio of the common solvent flowing the first solvent path and the second solvent path based on the received measurement signals.

5. The gas purification system of claim 1, wherein a syngas in the gas path interacts with the common solvent in the first solvent path in the $H_2S$ absorber to transfer $H_2S$ from the syngas to the common solvent.

6. The gas purification system of claim 5, wherein the syngas in the gas path interacts with the common solvent in the first solvent path in the $CO_2$ absorber to transfer $CO_2$ from the syngas to the common solvent.

7. The gas purification system of claim 1, wherein the flash tank is configured to generate a change in pressure to strip at least a portion of $CO_2$ from the common solvent in the second solvent path.

8. The gas purification system of claim 1, wherein the $H_2S$ concentrator is configured to strip at least a portion of $CO_2$ from the common solvent to increase a concentration of $H_2S$ in the common solvent.

9. The gas purification system of claim 1, wherein the second solvent path extends sequentially through the $H_2S$ concentrator and a solvent stripping column configured to remove $H_2S$ from the common solvent and to generate an acid gas stream.

10. A gas purification system, comprising:
a hydrogen sulfide ($H_2S$) absorber configured to remove $H_2S$ from a raw gas to produce a sweet gas and an $H_2S$ rich fluid;
a solvent recovery unit configured to generate an acid gas stream from the $H_2S$ rich fluid; and
a carbon dioxide ($CO_2$) recovery unit configured to remove $CO_2$ from the sweet gas to produce a $CO_2$ capture gas, wherein the $H_2S$ absorber and the $CO_2$ recovery unit utilize a common amine solvent to remove the $H_2S$ from the raw gas and the $CO_2$ from the sweet gas, wherein the solvent recovery unit is configured to receive the common amine solvent from each of the $H_2S$ absorber and the $CO_2$ recovery unit, wherein the solvent recovery unit is configured to separate $CO_2$ from the common amine solvent to generate a $CO_2$ stream and to transmit the $CO_2$ stream to a $CO_2$ compression unit, wherein the $CO_2$ compression unit is configured to combine the $CO_2$ stream from the solvent recovery unit with the $CO_2$ removed from the sweet gas to produce the $CO_2$ capture gas.

11. The gas purification system of claim 10, wherein the sweet gas comprises sweet syngas that includes at most approximately 25 parts per million $H_2S$.

12. The gas purification system of claim 10, wherein the $CO_2$ capture gas includes at most approximately 2000 parts per million $H_2S$.

13. A gas purification system, comprising:
a hydrogen sulfide ($H_2S$) concentrator column configured to be pressurized to a first pressure level, comprising:
a first solvent inlet configured to receive a first solvent that is rich in carbon dioxide ($CO_2$) and lean in $H_2S$;
a second solvent inlet configured to receive a second solvent that is rich in H2S and rich in $CO_2$;
packing material configured to facilitate mass transfer between vapor and liquid phases of the first and second solvents;
a solvent outlet configured to transfer a mixture of the first and second solvents out of the $H_2S$ concentrator column;
a first gas inlet configured to receive a stripping gas rich in $CO_2$; and
a first gas outlet configured to exhaust the stripping gas rich in $CO_2$.

14. The gas purification system of claim 13, comprising a flash tank configured to flash the mixed solvent to separate $CO_2$ from the mixed solvent.

15. The gas purification system of claim 13, comprising a reboiler configured to heat the mixture of the first and second solvents above a temperature wherein a vapor pressure of dissolved components in the mixture of the first and second solvents exceeds the first pressure.

16. The gas purification system of claim 15, wherein the reboiler comprises a second gas inlet configured to receive a stripping gas lean in $CO_2$ and a second gas outlet configured to exhaust the stripping gas rich in $CO_2$ to the gas inlet of the $H_2S$ concentrator, wherein the stripping gas lean in $CO_2$ is configured to strip the $CO_2$ from the mixture of the first and second solvents to generate the stripping gas rich in $CO_2$.

* * * * *